Dec. 22, 1959 — C. P. XENIS — 2,917,762
APPARATUS FOR TRAVELING THROUGH PIPES
Filed April 30, 1956 — 5 Sheets-Sheet 1
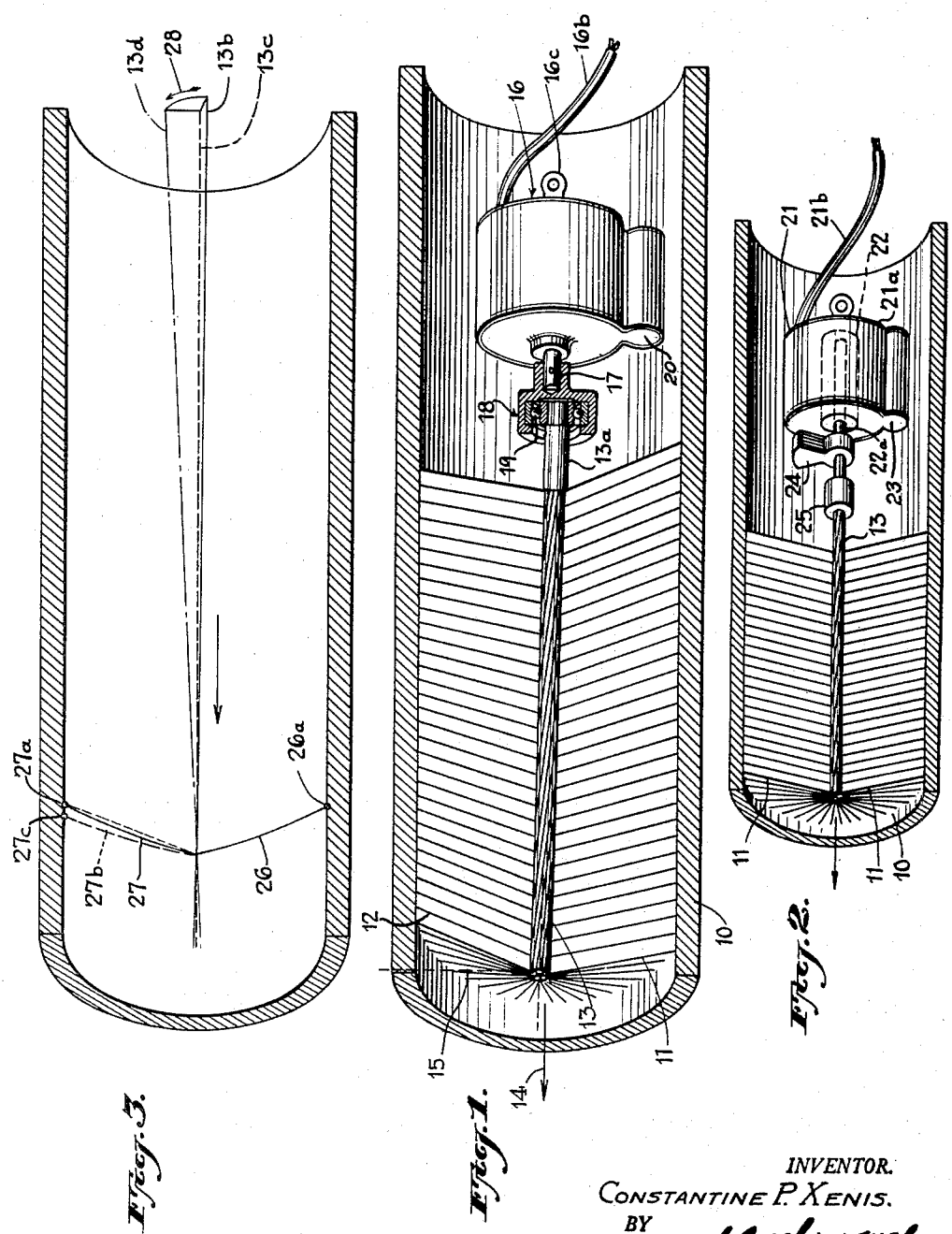
INVENTOR.
CONSTANTINE P. XENIS.
BY
ATTORNEYS.

Dec. 22, 1959 C. P. XENIS 2,917,762
APPARATUS FOR TRAVELING THROUGH PIPES
Filed April 30, 1956 5 Sheets-Sheet 2
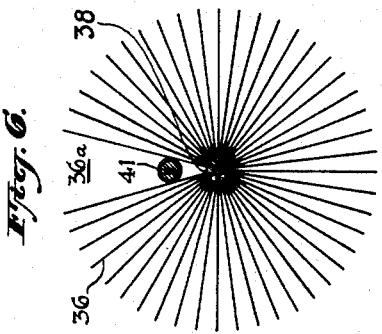
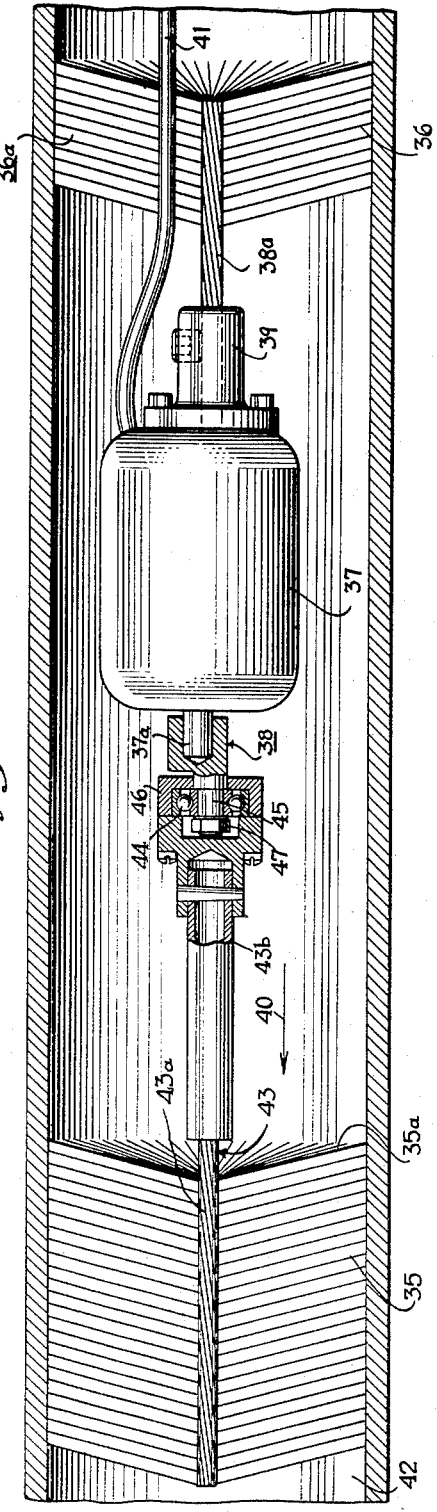
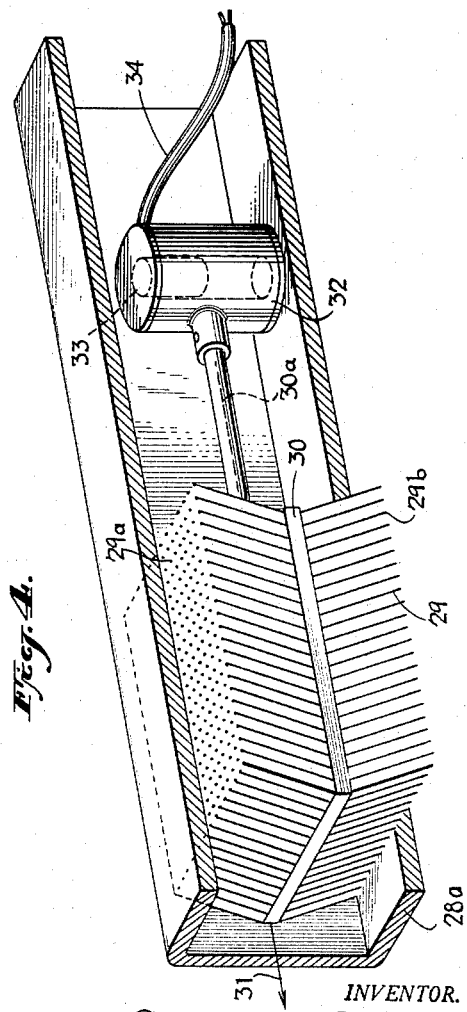
INVENTOR.
CONSTANTINE P. XENIS.
BY
*Ward, Crosly & Neal*
ATTORNEYS.

Dec. 22, 1959   C. P. XENIS   2,917,762
APPARATUS FOR TRAVELING THROUGH PIPES
Filed April 30, 1956   5 Sheets-Sheet 3
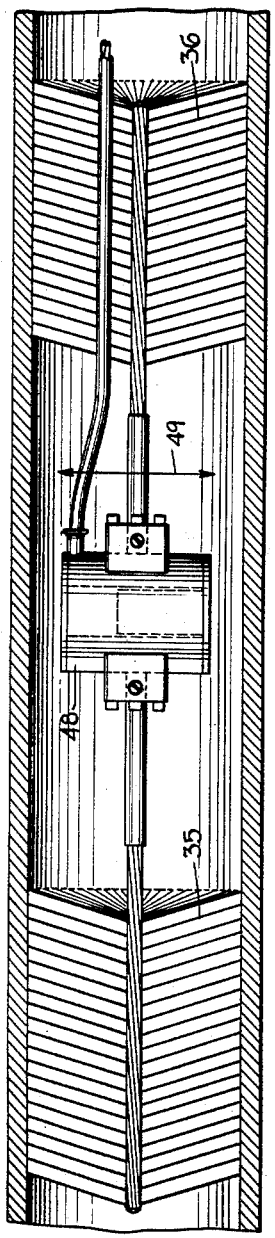
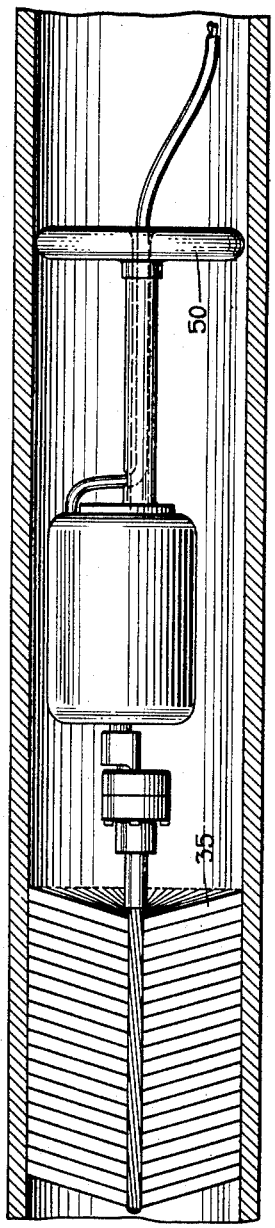
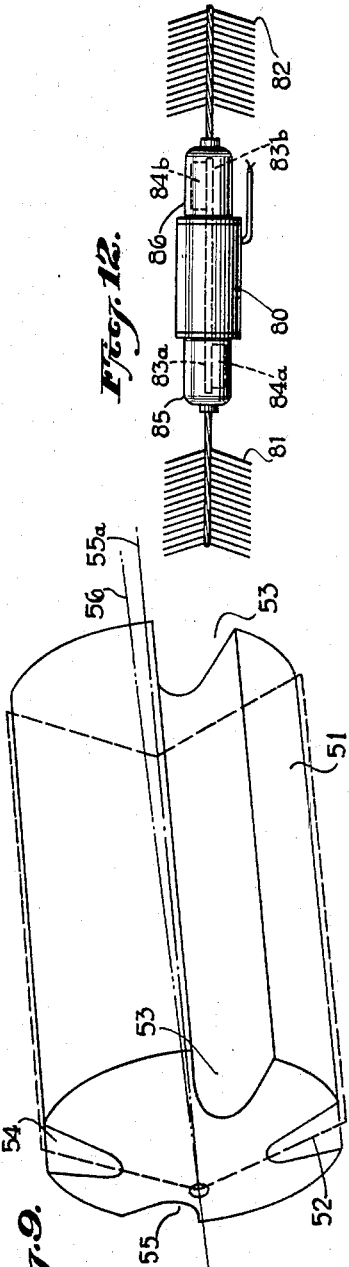
INVENTOR.
CONSTANTINE P. XENIS.
BY
ATTORNEYS.

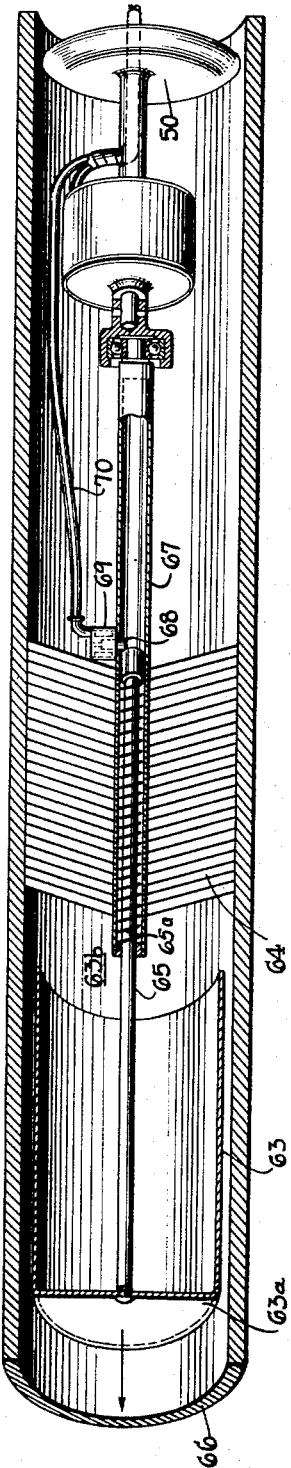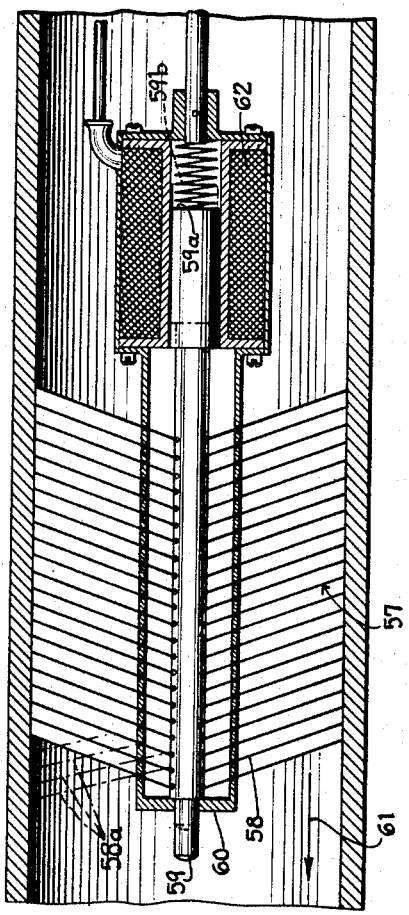

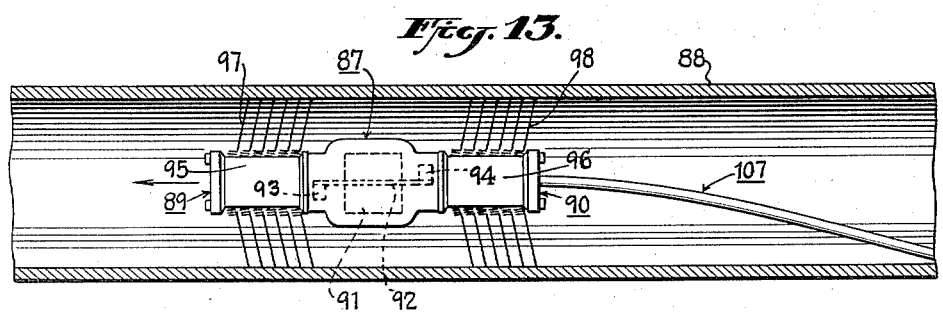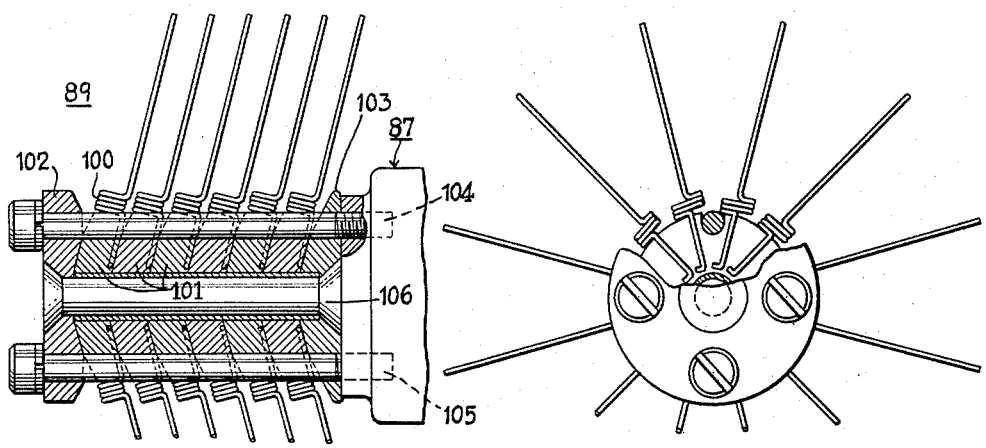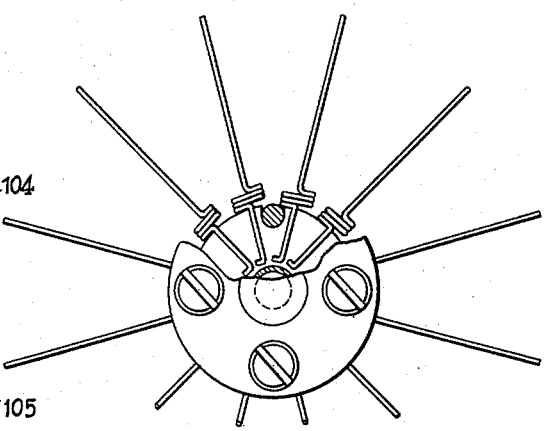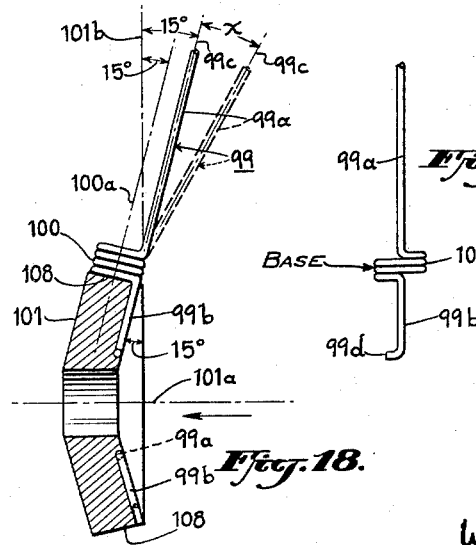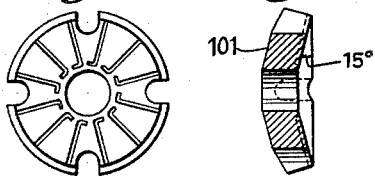
INVENTOR.
CONSTANTINE P. XENIS.

United States Patent Office 2,917,762
Patented Dec. 22, 1959

2,917,762

APPARATUS FOR TRAVELING THROUGH PIPES

Constantine P. Xenis, Douglaston, N.Y., assignor to Consolidated Edison Company of New York, Inc., New York, N.Y., a corporation of New York Application April 30, 1956, Serial No. 581,630

24 Claims. (Cl. 15—104.05)

This invention relates to apparatus for traveling through pipes, conduits and the like and more particularly to apparatus for threading and/or cleaning such pipes or conduits.

Apparatus of this character heretofore proposed has been undesirably complicated in construction and expensive to manufacture. Furthermore, such devices of the types heretofore proposed have been undesirably slow in their travel time through pipes or conduits, and have been easily impeded by foreign matter, such as sand or earth in the conduits.

One of the objects of the present invention is to overcome or minimize the above difficulties.

The invention in one form thereof is constituted by a pair of brushes which, for example, may be of circular cross sectional shape having a central core supporting the bristles. The bristles are designed for supporting the core in a position spaced away from the walls of the conduit or pipes through which the apparatus is to travel, the diameter of the brushes being normally preferably slightly in excess of the inside diameter of such passage. Furthermore, the bristles of the brushes are tilted in a common direction relative to the longitudinal axis of the apparatus, that is, they are tilted generally backward with respect to the proposed direction of motion. Such brushes support therebetween a suitable vibratory power means whereby the core members are vibrated in directions substantially at right angles to the longitudinal axis of the apparatus. In one embodiment of the invention the vibratory power means comprises an electric motor which is attached to one of the brushes and is operatively connected to the other one by means of an eccentric element whereby the longitudinal axes of the brushes are movable in a path conforming to a conical surface of revolution. This form of motion results in advancing linearly the extremity of each bristle in the conduit by somewhat bowing the bristle in response to such vibratory force which moves the brush core toward the extremity of such bristle and thrusts same forwardly, the oppositely extending bristle maintaining a foothold on the interior surface of the conduit thereby causing such advancement. Generally opposed pairs of bristles thus are manipulated successively around the angular extent of the cylindrical brush thereby to cause the apparatus to propel itself through such passage.

The invention is particularly useful, for example, for the purpose of installing electrical cables for power and communication purposes in underground conduits after same have been laid. For this purpose the apparatus may be used to drag through the conduit a wire or small cable. After such wire or small cable is drawn into the conduit to extend from one end thereof to the other, it may be used to pull the electrical cable into the desired position in the conduit. Heretofore it has been the common practice to install such electrical cables in underground conduits by a so-called "rodding" operation according to which a small cable has to be poked or pulled through the conduit by the use of rods. Similar problems arise with conduits when an electrical cable therein breaks or burns out so that pieces thereof have to be extracted from opposite ends of the conduits leaving nothing therein with which to pull through a new cable. Such rodding operations are laborious, time consuming and expensive to carry out, but notwithstanding such facts, there has heretofore been no fully satisfactory alternative available for use in many situations and particularly where the conduit has become partially clogged with sand, earth and other obstructions.

Various, further and more specific objects, features and advantages of the invention will clearly appear from the detailed description given below taken in connection with the accompanying drawings which form a part of this specification and illustrate, by way of example, preferred forms of the invention, which consists in such novel combinations of features as are shown and described herein.

In the drawings:

Fig. 1 is a perspective view, partly in section and with parts broken away, showing one form of apparatus embodying the invention;

Fig. 2 is a somewhat schematic longitudinal view of a modification of the embodiment shown in Fig. 1;

Fig. 3 is a schematic representation of a pair of opposed brush bristles, indicating the action thereof under the influence of vibratory motion in accordance with the invention;

Fig. 4 is a perspective view, partly in section and with parts broken away, of apparatus embodying a second form of the invention;

Fig. 5 is a longitudinal view, partly in section and with parts broken away, showing a further embodiment of the invention;

Fig. 6 is an end view of the apparatus shown in Fig. 5;

Figs. 7 and 8 are side views indicating schematically additional separate embodiments of the invention;

Fig. 9 is a perspective view of a cylindrical brush which may be employed in the present invention and which has been formed with peripheral slots therein which extend from the forward to the rear extremities thereof;

Fig. 10 is a schematic representation, partly in section and with parts broken away, showing means for making the apparatus reversible by reversing the angle of tilt of the bristles of the brush;

Fig. 11 is a schematic representation of means for facilitating the retraction of the apparatus in a reverse direction to its normal travel by enclosing the brush within a container;

Fig. 12 is a somewhat schematic view of a further desirable embodiment of the invention;

Fig. 13 is a side elevational view, partly in section and with parts broken away, of another embodiment of the invention;

Fig. 14 is a fragmentary view, also partly in section and with parts broken away, of the front portion of the apparatus shown in Fig. 13;

Fig. 15 is a front elevation of the parts shown in Fig. 14 with parts broken away;

Fig. 16 is a front view of a dished plate-like or disc-like spacer element which is employed as a part of a core member of a brush-like device as shown in Fig. 14;

Fig. 17 is a vertical sectional view in side elevation of the parts shown in Fig. 16;

Fig. 18 is a vertical sectional view in side elevation, and upon a relatively enlarged scale, of the members shown in Figs. 16 and 17 in combination with a bristle having a coil at the base thereof and showing illustratively the position of such bristle before and after insertion of the apparatus embodying the invention into a conduit; and Fig. 19 is a rear view of a bristle such as that shown in Fig. 18.

Referring to the drawings in further detail, particularly the embodiment of Fig. 1, the novel apparatus is shown in position for traveling through a conduit or pipe 10, the passage of which is of substantially circular cross section. A brush is shown at 11 of a cross sectional shape substantially corresponding to that of the passage of the conduit through which it is to travel. Said brush 11 consists of a plurality of bristles, as at 12, which are secured to a core member 13. Such bristles extend generally radially from the core member and hold the latter in a position spaced apart from and substantially centrally of the inner surfaces of the conduit 10. Furthermore, said bristles, although extending generally radially from the core member 13, are tilted relative thereto in a common direction, that is, backward with respect to the direction of motion of the apparatus indicated by the arrow 14. That is, the bristles throughout at least a considerable portion of the length thereof are angularly offset with respect to a line, as at 15, which is perpendicular to the longitudinal axis of the core member 13.

For the purpose of causing the apparatus to propel itself or crawl through the conduit 10, a vibratory motion is imparted to the brush in a direction substantially at right angles to the longitudinal axis of the brush or the longitudinal axis of the passage of the conduit. In the form shown in Fig. 1, such vibratory motion is effected by moving the core member 13 of the brush 11 in such a manner that it generates a generally conical surface of revolution. For this purpose a motor 16 is employed having a shaft 17 which, through the intermediary of an eccentric 18 is connected to the rear extremity 13a of the core member 13. A suitable anti-friction bearing, as at 19, is employed in the eccentric 18 thereby to prevent the transmission of a torque to the core member 13 which would otherwise cause the latter to rotate about its longitudinal axis.

Suitable means are provided for preventing the housing or frame of the motor 16 from rotating, for example, a counterweight 20 secured to such housing.

An alternative arrangement is shown in Fig. 2 wherein the aforementioned eccentric 18 is eliminated and a motor 21 is employed having an armature 22 which is rotatable within a suitable frame 21a provided with a counterweight 23 which prevents the rotation of the frame. An eccentrically positioned weight 24 is secured to the shaft 22a of the armature 22 and in order to avoid the transmission of a torque tending to rotate core member 13 about its axis, a suitable rotatable anti-friction coupling device, such as a ball bearing assembly, interconnects such core member to the armature shaft 22a thereby holding same in coaxial alignment.

Motors 16 and 21 respectively are provided with suitable electrical leads 16b and 21b extending to the exterior of the conduit for interconnection to a source of electrical power.

The cross sectional shape of the brush 11 in Figs. 1 and 2 is circular or substantially so and the diameter thereof is preferably slightly in excess of the inner diameter of the conduit 10 although it is within the purview of the invention for the diameter of such brush to be substantially equal to such inner diameter. The device will still operate even if the brushes are of a diameter somewhat smaller than that of the conduit, but the ability of the device to pull loads through the conduit will be very limited.

The length of the brush 11 in the form shown in Figs. 1 and 2 is sufficient to provide support for the motor 16 or 21 such that the latter is held and spaced away from the inner surfaces of the conduit. That is, no other support need be provided for holding the motor in such spaced position relative to the inside of the conduit. The counterweights 20 and 23 are sufficient to prevent rotation of the respective motor frames thereby to assure the aforementioned oscillation of the brush core member 13.

In the operation of the embodiments of Figs. 1 and 2, electrical energy is applied to the motor 16 or 21 and by virtue of the eccentric 18 or the eccentric counterweight 24, the core member 13 is moved thereby to generate a conical surface of revolution as indicated in Fig. 3 or at least the longitudinal axis of such core member is so moved. Consider, for example, the effect of this movement of the core upon two oppositely disposed bristles 26 and 27, as shown in Fig. 3 and which, for purposes of illustration, are shown as situated in a vertical plane. When the longitudinal axis of the core is in the position designated by line 13b, the bristles 26 and 27 are in the position shown in solid lines. That is, the outer extremities thereof are respectively positioned at points 26a and 27a, the latter being vertically above the former. The normal longitudinal axis of the core is indicated by the broken line 13c. In operation the core member axis 13b angularly will shift under the influence of the vibrating means, for example, upwardly in the direction of the arrow 28 to the position shown by the broken line 13d which, for purposes of illustration, represents a 90° movement from the position shown at 13b. In its new position the axis 13d forms with the axis 13c a vertical plane and thus is coplanar with the bristles 26 and 27. Due to the above-described tilt of the bristles 26, 27 in a common direction relative to the brush axis, the foot or outer extremity of the bristle 26 will maintain its foothold at 26a despite the now upwardly tilted position of the brush axis 13d. The core member 13, by virtue of such upwardly tilted position, will communicate an advancing force to the upper bristle 27 causing same to move forward to the position shown in broken lines at 27b thereby advancing the outer bristle extremity to the point 27c. Each opposed pair of bristles is acted upon in succession around the full angular extent of the brush 11, that is, through 360°, by virtue of the circular motion applied to the righthand extremity of the core member 13, as viewed in Figs. 1 and 2. By means of such advancing motion of each opposed pair of bristles, the entire apparatus is capable of crawling or traveling through the conduit 10 at a substantial speed.

A suitable eyelet member, as at 16c, may be secured to the rear of the motor 16 to which may be attached a line in the form, for example, of a wire which it is desired to pull through the conduit 10. Also, if desired, the electrical lead 16b can be made of sufficient strength to serve this purpose.

It is within the scope of the invention, in lieu of employing means for so moving the brush core member 13 to generate a surface of revolution, instead to vibrate such core member reciprocatively in a straight line at right angles to the axis of the conduit or the longitudinal axis of the brush 11 whereby the axis of the brush core member is moved in a plane.

Another form of the invention is illustrated in Fig. 4 and comprises apparatus for traveling through a conduit 28a, the passage of which is other than circular in cross section, such passage having, for example, a square cross section. A brush 29 of corresponding cross sectional shape is employed having, for example, a plate-like core member 30 positioned substantially horizontal and to which are secured the plurality of bristles comprising the brush. Such bristles, as in the previous embodiments, are tilted backward with respect to the direction of motion of the apparatus, such direction being indicated by the arrow 31. The vertical dimension of the brush from its upper to its lower sides, that is, from sides 29a to 29b, is preferably slightly in excess of the vertical dimension of the passage of the conduit 28a.

Vibratory motion is imparted to the brush 29 by means of a solenoid 32 having a suitable vibratory member 33 therein which is reciprocative under the influence of a changing electrical field in a well known manner. The solenoid 32 is energized through a flexible lead 34 connected to a suitable source of electrical power. In the form shown in Fig. 4, the direction of reciprocative action is substantially perpendicular to the plate-like core member 30. The action of the vibrating means 32 upon the bristles of the brush 29 is identical to that described in connection with Fig. 3 with the exception that the longitudinal axis 30a of the brush core member 30 is moved reciprocatively in a plane which, in the form shown, happens to be vertical.

Referring now to the embodiment of Fig. 5, this example of the invention is constituted by front and rear brushes 35 and 36 which between them support a power means, such as an electric motor 37, the latter being connected to one of the brushes, for example, the forward one 35, through the intermediary of an eccentric shown generally at 38. The rear brush 36 can be secured directly to the frame of the motor 37 preferably by means such as shown at 39, that is, a socket mounted on the motor frame and in which the brush shaft is held by a screw.

Both of the brushes 35 and 36 are formed substantially similarly to the brush 11 in Figs. 1 and 2 and the bristles thereof preferably are tilted slightly to the rear of the apparatus, that is, tilted backward with respect to its direction of motion indicated by the arrow 40. Preferably the distance between the mid-point of the front brush 35 and center of the eccentric is substantially equal to the distance between the center of the rear brush 36 and the center of the eccentric so that brushes will tend to advance at the same rate as the result of the eccentric movement.

The motor 37 is provided with an electrical cable 41 for connecting same to a source of electrical power, such cable extending from the rear of the motor through a cutaway portion 36a of the brush 36. The bristles of the brush 36 may be thus cutaway also for the purpose of permitting foreign matter in the conduit, such as sand or earth, to be passed by the brush.

The front brush 35 is of circular cross section, as is conduit 42 through which the apparatus is designed to travel. To a core member 43 of the brush 35 are secured the plurality of bristles 35a of which the brush is composed, such bristles, for example, extending substantially radially from the core member 43. The latter may be, for example, of the twisted wire variety, as at 43a, grasping between the twisted wire elements thereof the bristles of the brush. In the form shown, core member 43 is embraced by an elongated rigid metal sleeve portion 43b in which the portion 43a is rigidly secured. The sleeve portion 43b is secured to the eccentric 38 by suitable means which permits free rotation of the shaft of the motor 37 without communicating such rotation to the core member 43 which otherwise might cause the latter to rotate about its longitudinal axis. That is, a suitable ball bearing assembly, as at 44, is connected with the eccentric 38, such ball bearing 44 being coaxial with the core member 43 and embracing within it an eccentric shaft 45 of the eccentric 38. Such eccentric shaft 45 is rigidly secured to a shaft 37a of the motor 37. The bearing 44 is protected within a housing 46, the outer extremity of shaft 45 being secured in position by means of a nut 47. The association of the shaft 45 with the bearing 44 and its housing 46 prevents any substantial relative axial movement between the shaft 45 and such bearing.

In the operation of the embodiment of Fig. 5, the bristles of each of the brushes are advanced in a manner analogous to that discussed in connection with Fig. 3 thereby causing the apparatus as a whole to propel itself through the conduit. The longitudinal axis of each of the brushes is moved in this embodiment to generate a conical surface of revolution. Consequently analogous vibrations are communicated by the motor 37 to both of the brushes. The rear brush 36 is secured to the frame of the motor 37 in such a manner that it resists the tendency of the frame of the motor to turn about its own axis. That is, the brush 36 provides means for engaging the conduit to prevent rotation of the motor frame and in addition thereto the brush 36 oscillates in such a manner to assist in the advancement of the apparatus through the conduit 42.

The brush 36, in the form shown, is somewhat shorter than the brush 35 but such brushes can be made any desired lengths.

The core members 43 and 38 of the brushes 35 and 36 respectively may be sufficiently flexible to assist substantially the ability of the apparatus to turn curves, that is, to move within a bent passage or pipe. However, it is not necessary for such core members to be flexible to enable the apparatus to propel itself around such curves because the bristles of the brushes have sufficient resilience so to assist the movement of the apparatus providing, of course, the apparatus is not so long that the motor 37 tends to scrape against the pipe while the device is attempting to make the turn.

The embodiment of Fig. 7 is similar to that shown in Fig. 5 with the exception that in lieu of the motor 37, a so-called straightline reciprocative device is employed, indicated schematically at 48, and also the eccentric member 38 is eliminated. Thus the forward brush 35 is secured directly to the frame of the vibratory member 48, as is the rear brush 36. Under the influence, for example, of a reversible electrical field, the vibratory member 48 can vibrate the core members of the brushes 35 and 36 in the same plane in the direction indicated by the arrows 49. In lieu thereof the vibratory member 48 may oscillate angularly about a preselected axis a suitable weight member, thereby tending to induce a "seesaw" oscillation to the longitudinal axis of the apparatus.

The embodiment of Fig. 8 is similar to that shown in Fig. 5 with the exception that in lieu of the rear brush 36 other means are employed for engaging the inner surface of the conduit to prevent rotation of the motor frame, such member comprising a disc-like member, as at 50, which may be of resilient or rubber-like material, if desired.

Referring now to Fig. 9, the conduit through which the apparatus is required to pass often contains sand or earth or other foreign matter and the brushes aforedescribed tend to push such foreign matter forward and if enough of it is present it can accumulate sufficiently completely to clog the conduit and thereby stall the apparatus. In order to overcome this, the brush or brushes employed in the apparatus may be slotted along the outer surface thereof, that is, a brush, as at 51 (Fig. 9), may have certain of the bristles thereof cut away or formed in such way to create one or a plurality of slots. For example, four slots are shown in Fig. 9, as at 52–55, inclusive. Generally such slots extend from the forward to the rear extremities of the brush and preferably are substantially straight in order to facilitate the passage of the brush over such foreign matter, that is, in order to facilitate the apparatus leaving the foreign matter where it is encountered in the passage. Such slots preferably are equally spaced about the periphery of the brush and the longitudinal axes of such slots can be, for example, (a) parallel to the longitudinal axis of the brush, the latter axis being indicated in one of its operating positions by the broken line 55a in Fig. 9; or (b) the axis of such slots can be slightly angularly offset relative to such axis 55a, for example, so as to be parallel to the axis 56 of the conduit in which it moves at a portion of the operating cycle at which the core member is inclined relatively to the longitudinal axis of the conduit.

Referring now to Fig. 10, means are provided for reversing the tilt of the bristles of the brush in order to permit reversal of the direction of motion of the apparatus in the conduit. A brush, as at 57, has bristles, as at 58, which are secured to a primary core member 59. The brush 57, for example, is of circular cross section and has its bristles 58 extending radially from the primary core member 59. The angle of the bristles 58 relative to the longitudinal axis of the core member 59 is controlled by a sleeve member 60 which encloses and embraces core member 59 and is coaxial therewith, such sleeve member having suitable openings therein through which the bristles 58 extend. Axial motion of either member 59 or member 60 relative to the other will produce a change in the angle of tilt of the bristles 58. In the form shown in Fig. 10, bristles 58 are tilted backwardly relative to the direction of motion of the apparatus indicated by the arrow 61. Suitable means are provided for shifting the primary core member 59 relative to the sleeve member 60 comprising, for example, a solenoid 62 which may be secured coaxially to and within an extension of the sleeve member 60 in such a manner that an extension of the rear end of the core member 59 acts also as a solenoid core. Suitable resilient means, such as a spring, may normally urge the brush core 59 to its lefthand position, as shown in solid lines in Fig. 10, thereby making it unnecessary to energize the solenoid 62 except when it is desired to reverse the direction of travel thereof. The energization of the solenoid 62 will shift the core 59 to the right (Fig. 10) thereby to move the righthand extremity 59a to the position shown in broken lines at 59b thereby changing the angle of tilt of the bristles 58 from the position shown in solid lines to that shown in broken lines at 58a.

Means are shown in Fig. 11 for facilitating the retraction of the apparatus by pulling same backwards out of the conduit, such means comprising a cylindrical can or container 63 which is pushed ahead of a brush 64 of the apparatus through the intermediary of a rod 65 which is coaxial with said brush. When it is desired to retract the apparatus, means are actuated which allow the brush 64 to crawl or propel itself into the can 63 thereby to nullify the resistance of the bristles of the brush to such retraction. The can 63 is closed at its front end, as at 63a, but open at its rear end, as at 63b. The outer diameter of the can 63 is, of course, smaller than the inner diameter of the passage in conduit 66 through which the apparatus passes but is not so small as to prevent the movement of the brush therein. The rod 65 is firmly secured to the front face of the can 63 and telescopically engages a suitable axially extending recess in a tubular brush core member 67 of the brush 64. The rod 65 is prevented from moving to the rear relative to the brush core member 67 by a suitable limit-stop comprising, for example, a solenoid actuated finger 68 which is movable under the influence of a solenoid 69. The solenoid 69 is energizable by electrical power supplied to it via a cord, as at 70. A coil spring 65a embraces rod 65 within tubular member 67, in the manner shown, and biases rod 65 rearwardly as viewed in Fig. 11.

In operation of the apparatus of Fig. 11, the finger 68 is normally in the position shown wherein it restricts the rearward movement of the rod 65 relative to the brush core 67. Consequently the apparatus will advance through the conduit 66 pushing ahead of it the cylindrical container 63 in a manner similar to that above described. The container 63, under such conditions, is held spaced well ahead of the brush 64. However, if it is desired for any reason to withdraw the apparatus, the solenoid 69 is energized thereby withdrawing the limit-stop finger 68 and permitting brush 64 to propel itself into the container 63 thereby enveloping the brush and nullifying the resistance of the bristles to retraction from the conduit.

Referring to the embodiment of the invention which is somewhat schematically indicated in Fig. 12, a motor is indicated at 80 mounted between brushes as at 81, 82. Such motor (as well as the other motors hereinabove referred to) may either be electrical or fluid driven.

The motor is provided with a shaft which protrudes preferably both forwardly and rearwardly, as at 83a and 83b, to carry near its ends eccentrically positioned weights thereon, as at 84a and 84b, these weights being located on the shaft preferably in positions 180° apart (although they may be at other relative positions, or even with no substantial relative angular displacement) so that the motor, when energized, is caused thereby to have a wabbling movement. The protruding shafts and weights on each end may be covered by housing extensions, as at 85, 86, to which the cores and brushes respectively are suitably rigidly affixed. This form of the invention has various advantages including the fact that all moving parts of the motor assembly may be completely enclosed thereby to protect the motor from possible injury due to the presence of dust, mud, etc. in the conduit. Furthermore, although either one or the other of the weights 84a or 84b might be omitted yet with the use of two weights positioned 180° apart, a well balanced construction is made possible for giving the two brushes the same kind and degree of vibratory motion but the motions having a 180° phase relationship effectively contributing to the uniform travel of the apparatus. Also with this form of the invention there is no occasion to have any special means to prevent the motor housing and brushes from rotating.

Referring now to the embodiment shown in Figs. 13–19, with particular reference to Fig. 13, a motor 87 is provided which is adapted to be supported within a conduit 88 by means of front and rear brush-like members 89 and 90, respectively. The motor 87 is provided with an armature 91 having a rotating shaft 92 which is journaled in suitable bearings and which has suitable eccentric weights 93 and 94 disposed at either end of such shaft 92. Such weights are 180° out of phase with one another thereby to produce a wabble or vibratory motion of the motor and its brushes.

The brush-like members 89 and 90 each comprise respectively core members 95 and 96 outwardly from which protrude groups of bristles 97 and 98, respectively, the core members 95 and 96 being located intermediate the extremities of substantially oppositely extending of the bristles or fingers thereof.

It will be noted that each of the core members 95 and 96 is rigidly secured to the housing for the motor 87 and is preferably coaxial therewith.

Referring now to Fig. 18, reference is made to a single bristle or bristle-like finger 99 which is distinguished from the bristles or fingers heretofore discussed, such as 27 (Fig. 3), by virtue of the fact that integral therewith at the base thereof in contact with and external to the core member there is located a coil 100, the axis 100a of which extends outwardly from an axis 101a of the core member 95 and which is, in the form shown, substantially parallel to the finger 99 when the latter is in its normal position prior to insertion into a conduit. Such position is shown in full lines in Fig. 18, an illustrative position of such bristle after insertion into the conduit being shown in broken lines in such figure.

The bristle 99 thus is composed of: an outer bristle or finger portion 99a which extends from said coil 100 outwardly of the core member, the aforementioned coil 100, and an anchor portion 99b which is that portion extending from the coil 100 inwardly into the core member 95 thereby to be anchored between two spacer elements 101 of which, in the form shown, six are required to make up the brush-like device 89, it being understood, of course, that the rear brush-like device 90 is similarly constructed. In addition to such spacers 101 (Fig. 15) there are employed (Fig. 14) a front flange 102 and a rear flange 103, the group of spacers and their front and rear flanges being held together by a plurality of suitable longitudinally extending bolts, such as 104 and 105.

The spacer elements 101 may be made, for example, of aluminum and when they are superposed with the bristles or fingers 99 positioned as shown in Figs. 13 and 14 distributed in their selected positions, the assembly may be subjected to a compressive force to cause the anchor portions 99b of each bristle to be urged into the soft metal of the spacer thereby positively to anchor same in position.

A flush head rivet 106 may also be provided (Fig. 14) for urging together the several elements centrally of the brush-like device 89.

I have found it desirable to dispose each of the bristle-like fingers 99 in its respective brush-like device so that prior to inserting the device into a conduit it assumes the attitude shown in solid lines in Fig. 18 and also in Fig. 14.

Thus, as is well shown in Fig. 18, the bristle or finger 99 extends outwardly from the brush-like device 89 at an angle which is tilted backwardly with respect to the normal 101b to the direction of forward motion of the device and in the form shown this angle is 15°. That is, the axis 99c of the finger 99 is disposed at an angle of 15° with respect to the line 101b which is normal to the axis 101a.

It is desirable but not mandatory for the axis 100a of the core 100 to be substantially parallel to the axis of the finger 99 prior to the insertion of the device into a conduit.

The advantages of employing the bristle 99 with the coil 100 at the base thereof as shown in Figs. 13–19 are as follows:

(a) This construction substantially minimizes and possibly eliminates the likelihood of the breakage of the bristles which might otherwise occur at the base or root thereof as the result of vibration of the apparatus when not in a conduit. This comes about by virtue of the fact that the coil 100 acts as a shock absorbing member to protect the bristles particularly at such root or base thereof where each bristle enters the core member.

(b) The outer diameter of each brush-like device, for example 89, is larger than the inner diameter of a conduit into which the apparatus is to move and hence each bristle is tilted backward (as is well shown in Fig. 18) when the apparatus is inserted into a conduit, the tilting being, for example, from the position shown in full lines in said Fig. 18 to that shown in broken lines. If the coil 100 were not present in each bristle, the reduction in the outer diameter of the brush-like device occasioned by the insertion thereof into the conduit would be accomplished by a bowing of each bristle and hence, in the absence of such coil, part of the force which is employed for advancing the apparatus may be used for the purpose of merely further deflecting or bowing each bristle. However, in the improved embodiment of Figs. 13–19 the outer diameter of the brush-like device is reduced to accommodate the inner diameter of the conduit by an opening up or spreading of the forward portion of each coil 100 without causing any appreciable deflection or bowing in the portion 99a of each bristle.

(c) The apparatus of Fig. 13 can be reversed by pulling on the cord 107 thereof with a substantially reduced force as compared to that required for reversing or pulling out the apparatus shown, for example, in Fig. 12. Furthermore, when it is required to pull back or withdraw the duct crawler of Fig. 13 there is a reduced tendency to damage the bristles or fingers of each brush-like device because of the resilient and cushioning action of the coil 100 of each bristle.

(d) In the manufacture of apparatus of this type of relatively large outer diameter such as that designed for crawling through conduits of large diameter, such as gas mains or petroleum pipe lines where the inner diameter of the conduit may be of the order of one or two feet or possibly even greater, it is necessary to employ wire for the bristles or fingers which is of correspondingly heavier type or larger diameter. As the diameter of such wire is increased for this purpose, it becomes relatively stiff and is not well adapted for use in such large diameter devices without the employment of the coils of the type shown at 100 hereabove.

The ease or difficulty with which a given bristle can be moved from its initial position, as shown in solid lines in Fig. 18 to a new position, for example, as shown in broken lines in such figure, is a function of the following factors:

(1) The diameter of the coil 100;
(2) The number of turns of such coil;
(3) The diameter of the wire or finger; and
(4) The characteristics of the metal of the wire, for example, of spring steel or piano wire.

The ease of movement of the bristles when the device of Figs. 13–19 is pulled back for withdrawing same from the conduit in a reverse direction is also a function of such factors.

Thus the ability of each bristle to tilt, for purposes of "pull back," and its usability in a wider range of pipe diameters than is possible with the other embodiments, is greatly enhanced by the above enumerated factors (1)–(4) and such ability of each bristle to tilt as needed is accomplished without danger of a permanent set in the bristle and without appreciable loss of thrust transmissibility. The enhanced ability of each bristle of the embodiment of Figs. 13–19 to tilt or change its angle under the influence of the forces above mentioned is in large part due to the spreadability of the turns of the coil 100 in the front portion thereof in the form shown.

It should be noted that when a bristle is tilted as shown in Fig. 18 from its full line position to the broken line position, the front portion of the coil 10 is spread but this is not true with respect to the rear portion thereof and those portions of the turns of the coil 100 which are adjacent to one another in the rear thereof are the portions which transmit the thrust of the bristles 99 thereby to cause the device to advance in the conduit. That is, the rear portions of the turns of the coil 100 remain unspread and hence each such turn portion is in contact with the rear turn portion of the next adjacent turn or turns thereby enabling transmission of the forward component of thrust which advances the device as a whole.

Thus the form of the invention shown in Fig. 13 is adapted to be used in conduits of substantially greater range of inner diameters as compared to the range of inner diameters of conduits in which the other embodiments may be employed.

Although it is preferable for each bristle 99 (Fig. 18) to extend outwardly from the core member at the rear of its respective coil, the invention is not limited to this particular feature.

Also I have found that it is desirable for the anchor portion 99b (Fig. 19) of each bristle 99 to be coaxial with the portion 99a, prior to the insertion of the device into a conduit, because such coaxial relation assists in the transmission of the forward component of thrust to the core of the brush member. Here again this is a preferred but not a mandatory feature of this construction. Also I have found it desirable to form a bend portion 99d at the inner end of each bristle.

Further referring to Fig. 18, it will be noted that a surface 108 is provided upon which rests the inner turn of the coil 100 and that such surface comprises a section of a cone, the sides of which are preferably 15° angularly offset from the central axis 101a. That is, the angle of revolution of the surface 108 is preferably substantially similar to the tilt of the bristle 99 when it is withdrawn from the conduit and in normal attitude. In other words, the normal degree of tilt of each finger 99 prior to insertion into a conduit is substantially equal to the angle of the conical surface 108, the latter, of course, being substantially normal to each bristle prior to insertion into a conduit.

With all of the embodiments of the invention the brush bristles may be formed of spring steel wire, other metal wire or other suitable material or, if preferred, depending upon the size of the conduit in which the apparatus is to be used, the brushes may be formed of other materials commonly used as bristles for brushes of the size desired.

There is thus provided novel means for traveling through a passage of a conduit or pipe, which means are capable of so-called "threading" the conduit with suitable cables, for example, a light pilot cable, to which may be attached a heavier lead sheathed electrical cable. The apparatus, in addition to performing the so-called threading function, can be employed for transporting any other object through a conduit. For example a leaky pipe may be repaired by the application of sealing material, by transporting the sealing means to the preselected point in the pipe and actuating such means by remote control. Or a chemical to be placed at a preselected location within a pipe, for example, for cleaning purposes, may be transported thereto in a suitable container. The distance through which the apparatus travels can be accurately determined by marking the electric cord by which the motor of the apparatus is energized or by marking suitable separate graduated wire or tape.

In the testing of long pipe lines employed, for example, in transporting hydrocarbon, it is often desirable to make tests of the joints of such pipe. The present apparatus is well adapted for transporting means for remitting radiant energy, for example, for emitting gamma rays, in order to take X-ray pictures of the welded joints of the pipe. Also the apparatus may be employed for cleaning conduits or pipes providing, of course, the amount of foreign matter within the passage is not so great as to completely clog same and stall such apparatus. For this purpose a shield may be located ahead of the front brush, if desired, to assist in urging said foreign matter ahead of the apparatus.

The apparatus embodying the invention is capable of urging itself through a conduit with a relatively low expenditure of electrical or other type of energy due to the fact that the vibratory motion of the vibrating means does not attempt to distort all of the bristles of the brush at one time but only a relatively small portion thereof, the maximum distortion occurring among those bristles extending in the direction of the so-called "throw" of the vibrating means. That is, the bristles on the upper portion of the brush core member 13 in Fig. 1 are subject to maximum distortion due to an upward movement of the eccentric 18 (with the parts in the particular positions here shown), those bristles along the top of the core member being distorted the highest amount, such distortion gradually diminishing toward a horizontal plane through the brush core member, assuming that the arm of the eccentric is extending substantially vertically, as shown in this figure. Thus there is a successive distortion of successive increments of bristles around its full angular extent in this embodiment.

Although I have found it desirable for most reliable results, initially to tilt the bristles of the brush or brushes employed in this apparatus, as above set forth, it is within the purview of the invention for such bristles initially to be without tilt prior to insertion into the pipe. That is, the bristles may extend (in the case of a circular brush, e.g. 35) substantially perpendicular to the longitudinal axis of the brush core. Or such bristles may extend prior to insertion into the conduit substantially perpendicular to the plate-like brush core, as in Fig. 4. Providing the diameter of the brush is somewhat in excess of the inner diameter of the pipe, the insertion of the brush into the pipe will automatically cause the bristles to be tilted rearwardly as compared to the direction of motion of the apparatus.

While the invention has been described with respect to certain preferred examples, it will be understood by those skilled in the art, after understanding the invention, that various changes and modifications may be made without departing from the spirit and scope of the invention and it is intended, therefore, in the appended claims to cover all such changes and modifications.

This application comprises a continuation-in-part of my copending patent application Serial No. 359,097, filed June 2, 1953.

What is claimed as new and is desired to be secured by Letters Patent is:

1. In apparatus for traveling through conduits and the like, the combination of: an elongated core member for a bush-like device, relatively stiff bristles secured to and extending outwardly from such core member having at least the outer extremities thereof adapted to assume in contact with the conduit walls, angularly offset positions in a common direction with respect to the longitudinal axis of such core member, said brush-like device having a dimension transverse to the longitudinal axis thereof which is slightly in excess of a corresponding transverse dimension of a conduit through which the apparatus is to travel, such bristles extending outwardly from the core member in circumferential array to support such core member spaced from the inner surfaces of a conduit, and means for moving said core member whereby a point along the axis thereof is urged in a substantially circular path thereby to advance the apparatus through a conduit, said brush-like device and core member being sufficiently elongated and having a sufficient number of bristles to ensure that the longitudinal axis of said apparatus extends substantially lengthwise of said conduit during operation of such apparatus.

2. In apparatus for traveling through conduits and the like, the combination of motor means, said motor means mounting a core member for a brush-like device, said core member in turn mounting a plurality of fingers, said core member being located intermediate substantially oppositely extending of such fingers at least the outer extremities of which fingers in contact with the conduit walls assume tilted positions in a substantially common direction, said fingers thus being disposed for supporting said core member in the conduit between opposite inner surfaces of a conduit, there being a sufficient number of said oppositely extending fingers to support said core member spaced from opposite inner wall surfaces of a conduit, and means drivably connected to and actuatable by said motor means for causing said apparatus to quiver and rapidly to move one extremity of the axis of said core member from one side of a norm longitudinal axis of said apparatus to the other side thereof thereby to advance the apparatus in the conduit.

3. In apparatus for traveling through pipes and the like, an elongated substantially cylindrical brush device having bristles adapted to engage the interior of a pipe while tilted in a common direction with respect to the longitudinal axis of such brush, power means for moving said brush whereby the longitudinal axis of the latter generates a generally conical surface of revolution thereby to cause said apparatus to advance through a pipe.

4. In apparatus for traveling through pipes and the like, the combination of: a pair of brush-like devices each having a core member and relatively stiff fingers secured to the core member, at least the outer portions of such fingers being adapted to assume in contact with the inner surface of such pipes a tilted attitude in a generally common direction relative to the longitudinal axis of such core members, such longitudinal axis extending substantially in the proposed direction of motion of such apparatus, such fingers being secured to such core member and extending outwardly therefrom in circumferential array for supporting the core member in a pipe spaced from the inner wall surfaces of the pipe; and means operatively connected to each core member and supported thereby for vibrating such core members to generate a substantially conical surface of revolution thereby to advance the apparatus through a pipe.

5. In apparatus for traveling through pipes, conduits and the like, the combination of a brush having bristles extending substantially radially from an elongated core member, said bristles being mounted upon said core member for supporting the latter in a pipe spaced away from the inner surfaces of the latter, each of said bristles being angularly offset in a common direction throughout at least a portion of the length thereof with respect to a line passing therethrough perpendicular to the longitudinal axis of said core member, a motor having a rotatable element, eccentric means for operatively interconnecting said brush core member and said rotatable element, and a second brush having bristles substantially similarly disposed relative to a core member therefor, said second brush being secured to said motor, the latter being interposed between and supportable by said brushes in such pipe.

6. In apparatus for traveling through pipes, conduits and the like, a brush having bristles tilted backward with respect to the axis of the apparatus, the bristles of said brush extending outwardly from an elongated brush core member, the outer extremities of said bristles being positioned whereby substantially diametrically opposed bristles will engage substantially diametrically opposed interior surface portions in the pipe through which the apparatus is to travel, a motor including power conduit means therefor operatively connected to said core member for angularly shifting same whereby the longitudinal axis thereof generates a substantially conical surface of revolution; and means connected to said motor for engaging an interior surface of such conduit thereby to prevent rotation of the motor frame.

7. In apparatus for propelling itself through a passage, a brush-like device having relatively stiff fingers adapted to be tilted in a generally common direction relative to the longitudinal axis of such apparatus when in contact with the inner surfaces of such passage, which axis extends substantially in the direction of motion of such apparatus, opposite sides of such passage being engageable concurrently by opposed finger ends of said brush-like device, and vibratory means secured to said brush-like device for vibrating same in a path substantially at right angles to such longitudinal axis.

8. In apparatus for traveling through conduits and the like, the combination of: an elongated core member for a brush-like device, a plurality of relatively stiff fingers secured to and extending outwardly from such core member in a plurality of opposite directions, said core member being located intermediate substantially oppositely extending of such fingers at least the outer extremities of which are adapted to assume in contact with the conduit walls, tilted positions in a common direction, with respect to the longitudinal axis of such core member, said fingers thus being adapted to support such apparatus between opposite inner wall surfaces of a conduit, and means for causing said core member to quiver laterally of the conduit to advance the apparatus in the conduit.

9. In apparatus for traveling through a tube having a passage therein of substantially uniform predetermined cross sectional dimensions, a pair of brush-like devices each having a core member and a plurality of relatively stiff bristles extending outwardly therefrom in at least two opposite directions for supporting such members spaced from opposite sides of such passage, said bristles at least along a portion of the length thereof being adapted to assume tilted attitudes in a generally common direction relative to the longitudinal axis of such core members when said brush-like devices are inserted into such passage; and means in connection with said brush-like devices and supported between and by such devices for rapidly moving portions of such core members from one side to another of a norm axis thereby to advance the apparatus in the passage.

10. In apparatus for traveling through pipes and the like having a passage of substantially circular cross section, a pair of brush-like devices each having a core to which are secured a plurality of relatively stiff bristles which are tiltable in a common direction in response to insertion of the apparatus into the pipe, said bristles extending outwardly from said cores and disposed for supporting such cores in a pipe spaced from and thus between opposite inner surfaces of such pipe, wherein such opposite inner surfaces are simultaneously engageable by such bristles, a motor in connection with and supportable by said brush-like devices therebetween when in a pipe, and means operated by said motor for vibrating said devices to move the longitudinal axes thereof along a generally conical surface of revolution thereby to advance the apparatus through the pipe.

11. In apparatus for traveling through pipes and the like, a brush-like device having a plurality of relatively stiff fingers and a central core member for supporting such fingers, the latter extending outwardly from such core member, said brush-like device having a dimension transverse to the longitudinal axis thereof which is slightly in excess of a corresponding transverse dimension of the pipe through which the apparatus is to travel, such core member being supportable in the pipe by such fingers and thus spaced away from the inner surface of the pipe, such fingers of said brush-like device being adapted to be at least partially tilted in a common direction with respect to said core member when in contact with the inner walls of such pipe, and power means connected to said brush-like device for oscillating the latter in a direction substantially at right angles to such longitudinal axis.

12. Apparatus in accordance with claim 1 wherein the bristles of said brush-like device are formed and arranged to provide an unobstructed substantially longitudinally extending slot along the outer surface of such device.

13. Apparatus in accordance with claim 1 wherein the bristles of said brush-like device are shaped to form a slot in such device along the outer surface thereof substantially parallel to the longitudinal axis of such device.

14. Apparatus in accordance with claim 1 wherein the bristles of said brush-like device are shaped to form a slot along the outer surface of said device, said slot being angularly disposed with respect to the longitudinal axis of such brush-like device whereby the axis of such slot is substantially parallel to the axis of a conduit in which such apparatus is designed to travel during a portion of the operating cycle at which such apparatus is inclined relatively to the longitudinal axis of the conduit.

15. Apparatus for traveling through conduits and the like comprising: a motor having a motor enclosure, brush-like members secured to the forward and rear portions respectively of said motor enclosure, such brush-like members having relatively stiff bristles, portions of which are adapted to assume in contact with the inner walls of a conduit tilted positions with respect to the longitudinal axis of such members, such bristles extending in a plurality of opposite directions for supporting such motor enclosure spaced from the inner walls of a conduit, the longitudinal axis of said apparatus extending along the longitudinal axis of a conduit when the apparatus is inserted in the conduit, such motor having its shaft rotatable about an axis adapted to extend longitudinally of the conduit, and off-center weight means associated with such shaft whereby, as the latter is rotated, a wabbling motion is imparted to the motor and attached brush members causing the apparatus to advance in the conduit.

16. Apparatus for traveling through conduits and the like comprising; a motor having a motor enclosure, brush-like members secured to the forward and rear portions respectively of such motor enclosure, each brush-like member having a core to which are secured a plurality of relatively stiff bristles which extend outwardly of the core and are spaced around the periphery thereof to support such core spaced from the inner wall surfaces of a conduit when the apparatus is inserted in a conduit, such bristles being adapted to engage the inner wall surfaces of a conduit in rearwardly tilting positions in response to such insertion in a conduit, such motor having a shaft rotatable about an axis adapted to extend substantially longitudinally of the conduit, and off-center weight means operatively connected to such shaft for imparting a wabbling motion to the motor and attached brush-like members in response to rotation of said shaft thereby causing the apparatus to advance in the conduit.

17. In apparatus of the class described, an elongated brush-like device having a plurality of relatively stiff bristle-like fingers extending from an elongated core member, the latter member being located intermediate the outer extremities of generally oppositely extending of such fingers to support said core member in spaced relation to opposite inner wall surfaces of a conduit in which the apparatus is adapted to be inserted with the longitudinal axis of the core member substantially aligned with that of such conduit, said fingers being adapted to engage opposite inner wall surfaces of the conduit and to assume when in contact with such inner wall surfaces a tilted attitude in a common direction relative to the longitudinal axis of said core member, wabble motor means, the latter mounting said core member which in turn mounts said fingers, said wabble motor means thus being connected to said brush-like device for wabbling the latter whereby at least portions thereof are moved from one side of a norm longitudinal axis of said apparatus to the other side thereof to advance the apparatus through a conduit, and power conduit means for conducting energy to said motor means, said brush-like device and core member being sufficiently elongated and having a sufficient number of bristle-like fingers extending therefrom to ensure that the longitudinal axis of said apparatus extends substantially lengthwise of such conduit during operation of the apparatus in the conduit.

18. Apparatus in accordance with claim 8 having means for facilitating the retraction of the apparatus from a conduit in which it is inserted, such means comprising a cylindrical container secured to such apparatus and positioned in front of such brush-like device in substantially coaxial alignment therewith, such container being closed at its front extremity and open at its rear extremity and of smaller outer diameter than the inner diameter of such conduit, means for securing said container to said apparatus being constructed and arranged for holding such container spaced from and ahead of said brush-like device and alternatively for permitting relative coaxial movement between such device and such container whereby said brush-like device can move within said container.

19. Apparatus in accordance with claim 8 including means comprising a portion of such apparatus and remotely controllable for varying the angle of said fingers with respect to the longitudinal axis of said core member.

20. In apparatus for traveling through conduits and the like, the combination of elongated core means for a brush device, a plurality of relatively stiff bristles secured to such core means, the core means being located intermediate generally oppositely extending of such bristles which thus support said core means spaced from opposite inner conduit surfaces when in a conduit, said bristles being adapted to assume when in contact with such inner conduit surfaces, angularly offset positions in a common direction with respect to the longitudinal axis of the core means, the outer extremities of substantially oppositely extending of such bristles being adapted simultaneously to engage opposite inner surfaces of such conduit, each of such bristles having formed at the base thereof in contact with said core means a helical coil, the axis of revolution of which extends outwardly from such longitudinal axis of the core means, each bristle protruding outwardly from the rear portion of its respective coil, the rear portions of adjacent turns of each of such coils remaining in contact with one another after the insertion of the apparatus into a conduit, a substantial portion of the innermost turn of each coil being in engagement with said core means, means for causing the core means to quiver laterally of the longitudinal axis of such apparatus to advance the apparatus through the conduit, said brush device and its core means being sufficiently elongated and having a sufficient number of bristles extending therefrom to ensure that the longitudinal axis of said apparatus extends substantially lengthwise of said conduit.

21. In apparatus for traveling through conduits and the like, a brush-like device comprising: an elongated core member, a plurality of relatively stiff bristles secured to such core member and extending outwardly therefrom in opposite directions about the periphery of said core member to support the core member spaced from the inner walls of a conduit, each of such fingers having formed at the base thereof in contact with said core member a coil the axis of which protrudes outwardly from such core member; and means including a motor mounted on said core member for rapidly moving one end of said device whereby a point on such end is caused to move from one side to the other of the longitudinal axis of the conduit thereby to advance the apparatus through the conduit.

22. In apparatus for traveling through conduits and the like, a motor having an enclosure, brush-like members connected to the front and rear portions respectively of such motor enclosure, such members each having a plurality of relatively stiff bristles which are adapted to assume in contact with the inner surfaces of the conduit tilted positions with respect to the longitudinal axis of such members, each of such bristles having formed at the base thereof a coil at least part of the innnermost turn of which is in contact with a core of one of such members, and means drivably connected to said motor for causing said apparatus to shake laterally relative to such longitudinal axis.

23. In apparatus for traveling through conduits and the like, a brush-like device having a plurality of relatively stiff bristles secured to a core member and extending outwardly therefrom in circumferential array adapted to support the core member spaced from the inner wall surfaces of a conduit, the core member thus being located intermediate generally oppositely extending of such bristles, such bristles being tilted in a common direction with respect to the longitudinal axis of such device, each of such bristles having a helical coil formed at the base thereof external to such core member, the axis of such coil extending outwardly from said core member, each bristle extending outwardly from the rear portion of its respective coil, each of the coils having adjacent turns normally in engagement with one another and being positioned with the radially innermost turn thereof in engagement with said core member, and means including a motor supported by such brush-like device when in a conduit for imparting a wabbling motion to such apparatus to advance same through a conduit.

24. In apparatus for advancing itself through a conduit, elongated brush-like means having relatively stiff bristles adapted to be tilted in a substantially common direction relative to the longitudinal axis of such apparatus in response to the outer ends of such fingers contacting the inner surfaces of such conduit, such longitudinal axis extending substantially in the direction of advance of such apparatus, said brush-like means having a dimension transverse to the longitudinal axis thereof which is slightly in excess of the transverse dimension of such a conduit through which the apparatus is to travel, substantially opposite inner wall surfaces of such conduit being engageable concurrently by the ends of substantially opposite of said fingers, and means supportable in such conduit by said brush-like means for causing said brush-like means to quiver from one side to the other of such longitudinal axis to advance the apparatus through the conduit.

References Cited in the file of this patent

UNITED STATES PATENTS

| | | |
|---|---|---|
| 377,875 | VonSchade | Feb. 14, 1888 |
| 508,380 | Gardner | Nov. 7, 1893 |
| 786,747 | Forbes | Apr. 4, 1905 |
| 1,799,385 | Moore | Apr. 7, 1931 |
| 2,151,416 | Black et al. | Mar. 21, 1939 |
| 2,372,731 | Nalbach et al. | Apr. 3, 1945 |
| 2,596,571 | Lewenhagen | May 13, 1952 |
| 2,641,791 | Wells | June 16, 1953 |

FOREIGN PATENTS

| | | |
|---|---|---|
| 189,763 | Germany | Sept. 25, 1907 |
| 614,592 | Great Britain | Dec. 17, 1948 |